US012645422B2

(12) United States Patent
Chen et al.

(10) Patent No.: US 12,645,422 B2
(45) Date of Patent: Jun. 2, 2026

(54) ADAPTIVE AUDIO PROCESSING DURING VIDEO CONFERENCING

(71) Applicant: ZOOM VIDEO COMMUNICATIONS, INC., San Jose, CA (US)

(72) Inventors: Yuhui Chen, San Jose, CA (US); Qiang Gao, Charlotte, NC (US); Zhaofeng Jia, Saratoga, CA (US); Shiwei Wang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 134 days.

(21) Appl. No.: 18/376,019

(22) Filed: Oct. 3, 2023

(65) Prior Publication Data

US 2024/0419391 A1      Dec. 19, 2024

(30) Foreign Application Priority Data

Jun. 16, 2023      (WO) ................ PCT/CN2023/100750

(51) Int. Cl.
*G06F 3/16* (2006.01)
*H04L 12/18* (2006.01)
(52) U.S. Cl.
CPC .......... *G06F 3/165* (2013.01); *H04L 12/1813* (2013.01)
(58) Field of Classification Search
CPC ....................................................... G06F 3/165
See application file for complete search history.

(56) References Cited

U.S. PATENT DOCUMENTS

| | | | | |
|---|---|---|---|---|
| 10,446,170 | B1 * | 10/2019 | Chen ...................... | G06N 20/00 |
| 11,621,016 | B2 * | 4/2023 | Deng ...................... | G06N 3/09 |
| | | | | 381/56 |
| 2016/0005422 | A1 | 1/2016 | Zad Issa et al. | |
| 2021/0360349 | A1 * | 11/2021 | Nyayate ................. | G10L 25/84 |
| 2022/0051652 | A1 | 2/2022 | Winsvold et al. | |
| 2024/0127839 | A1 * | 4/2024 | Clark ..................... | G06V 20/41 |

OTHER PUBLICATIONS

EP International Search Report and Written Opinion for PCT/ CN2023/100750 mailed Dec. 1, 2023.

* cited by examiner

*Primary Examiner* — Olisa Anwah
(74) *Attorney, Agent, or Firm* — Kilpatrick Townsend & Stockton LLP

(57) ABSTRACT

Techniques for adaptive audio processing during video conferencing are provided. In an example method, a client device joins a video conference hosted by a video conference provider, the video conference including a plurality of client devices. The client device receives, from an audio input device, an audio stream. The client device then processes, using an audio processing component, the audio stream. The client device determines, using a trained machine learning model, one or more characteristics of the audio stream. The client device then determines, based on the one or more characteristics of the audio stream, an audio configuration operation comprising one or more instructions. The client device executes the audio configuration operation. The client device then outputs the audio stream to the video conference provider.

20 Claims, 9 Drawing Sheets

ADAPTIVE AUDIO PROCESSING SYSTEM
332

ADAPTIVE PROCESSING SUBSYSTEM
412

NS MODE AUTO SWITCHING 512

REAL-TIME AUDIO QUALITY MONITORING
514

• • •

AUDIO EVENT DETECTION SUBSYSTEM
410

HIGH QUALITY MICROPHONE DETECTION
502

SINGLE SPEECH DETECTION
504

BABBLE DETECTION
506

MUSIC DETECTION
508

HIGH REVERBERATION DETECTION
510

• • •

500

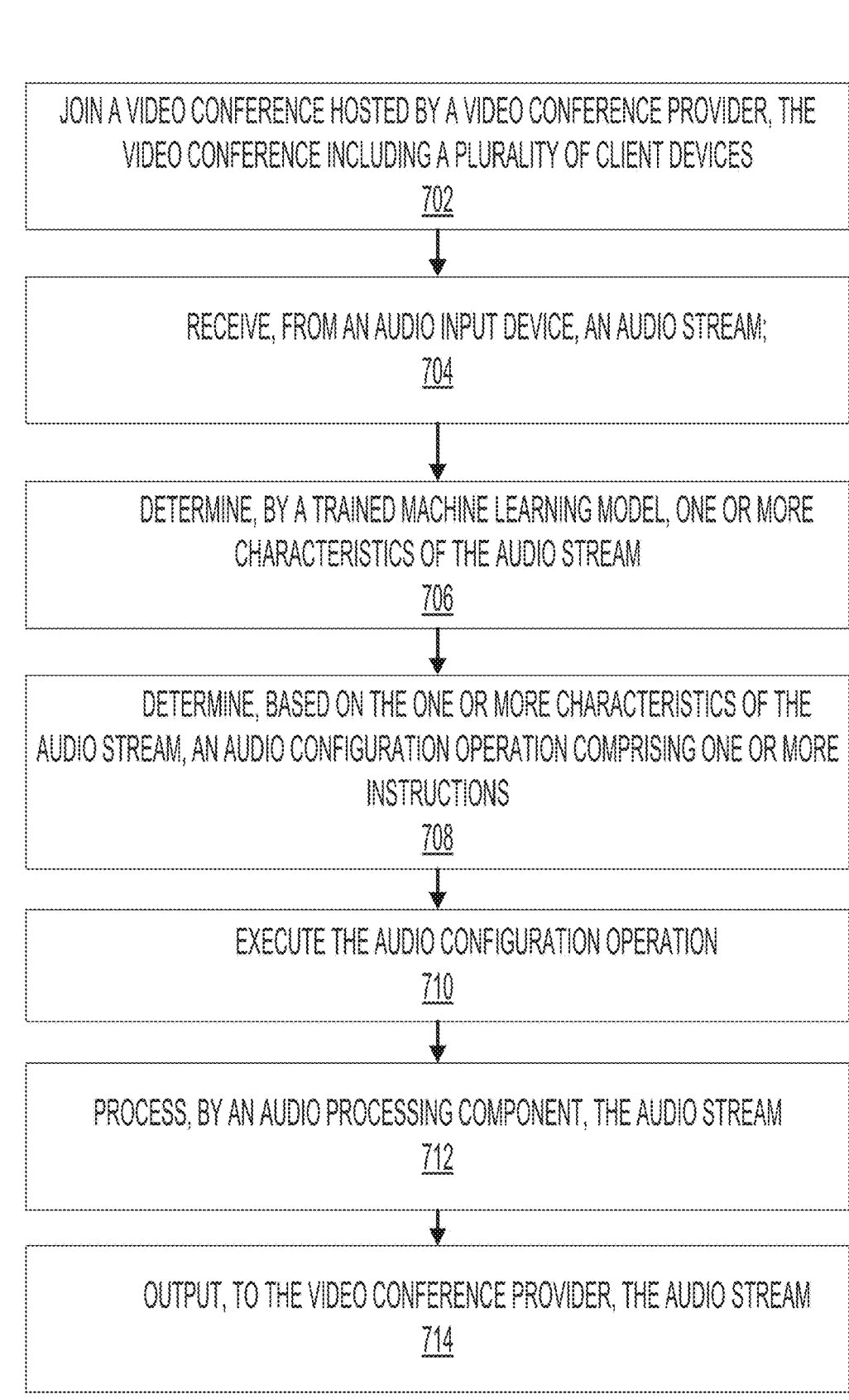

700

JOIN A VIDEO CONFERENCE HOSTED BY A VIDEO CONFERENCE PROVIDER, THE VIDEO CONFERENCE INCLUDING A PLURALITY OF CLIENT DEVICES
702

RECEIVE, FROM AN AUDIO INPUT DEVICE, AN AUDIO STREAM;
704

DETERMINE, BY A TRAINED MACHINE LEARNING MODEL, ONE OR MORE CHARACTERISTICS OF THE AUDIO STREAM
706

DETERMINE, BASED ON THE ONE OR MORE CHARACTERISTICS OF THE AUDIO STREAM, AN AUDIO CONFIGURATION OPERATION COMPRISING ONE OR MORE INSTRUCTIONS
708

EXECUTE THE AUDIO CONFIGURATION OPERATION
710

PROCESS, BY AN AUDIO PROCESSING COMPONENT, THE AUDIO STREAM
712

OUTPUT, TO THE VIDEO CONFERENCE PROVIDER, THE AUDIO STREAM
714

FIG. 7

| High Quality Microphone Detection | Single Speech detection | Babble detection | Music detection | NS Mode |
|---|---|---|---|---|
| Y | Y | N | N | Headset Aggressive |
| Y | N | N | N | Headset High |
| Y | N | Y | N | Target-Speaker |
| N/A | N/A | N/A | Y | Original Sound |
| N | Y | N | N | Medium |

FIG. 8

ADAPTIVE AUDIO PROCESSING DURING VIDEO CONFERENCING

CROSS-REFERENCE TO RELATED APPLICATIONS

This application claims priority to PCT international application number PCT/CN2023/100750 filed Jun. 16, 2023, titled "Adaptive Audio Processing During Video Conferencing," the entirety of which is incorporated herein by reference.

FIELD

The present application generally relates to audio processing, and more particularly relates to techniques for adaptive audio processing during video conferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 shows a flowchart of an example method for adaptive audio processing during video conferencing, according to some aspects of the present disclosure.

FIG. 8 shows a table relating to certain aspects of techniques for adaptive audio processing during video conferencing, according to some aspects of the present disclosure.

DETAILED DESCRIPTION

Figure 1:
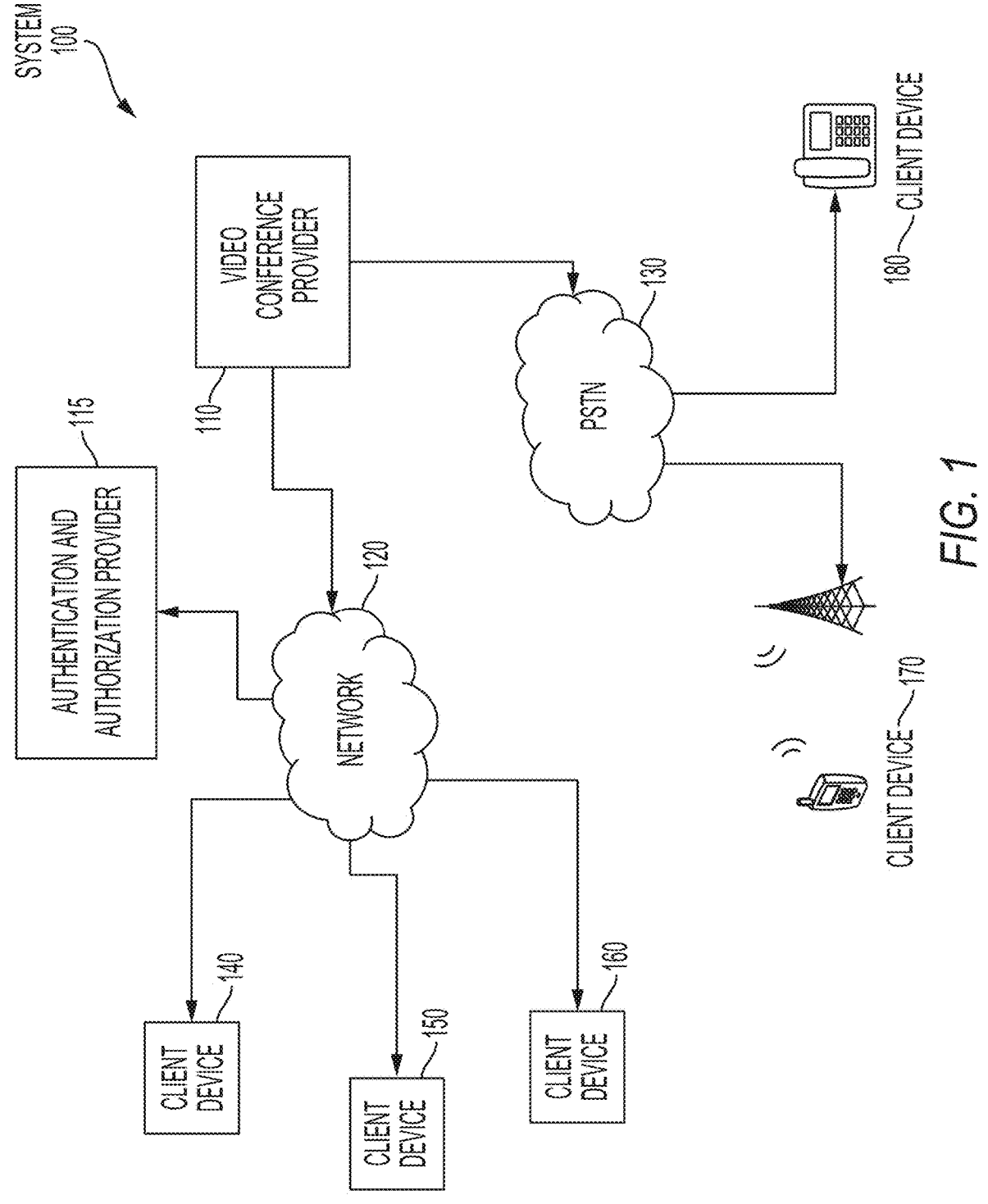
FIG. 1 shows an example system that provides videoconferencing functionality to various client devices.

Examples are described herein in the context of techniques for adaptive audio processing during video conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application—and business-related constraints, and that these specific goals will vary from one implementation to another and from one developer to another.

Video conferencing has become a routine component of personal and business communications. Indeed, video conferencing has enabled participants to conveniently join video conferences from any location, even globally. However, while joining a video conference from a noisy location may be convenient for the participant, it can result in a subpar user experience for the other participants. For instance, a participant may participate in a business-related video conference from a coffee shop or shared living space. The background noise in these locations may be captured by the microphone of the participant and be heard by the other participants, reducing hearing and comprehension, and ultimately impacting the effectiveness of the video conference.

Some video conference platforms have implemented techniques for processing the audio captured by the audio input devices of connected client devices to improve the user experience. For example, such techniques may include audio processing components such as acoustic echo cancellation (AEC), automatic gain control (AGC), and noise suppression (NS), sometimes referred to as denoising. AEC may eliminate echo from audio signals using adaptive filters. AGC can maintain consistent output volume by adjusting the gain of input signals. NS involves the use of various signal processing techniques to reduce unwanted background noise in a captured audio signal. In some examples of NS, the desired speech signal and the noise signal can be identified based on their distinct statistical properties. The identified noise component can be subsequently attenuated. Application of these techniques may, for example, improve speech intelligibility and deliver an improved audio experience to the video conference participants.

However, the effectiveness of the techniques is highly sensitive to the current audio environment. In particular, the techniques may require substantial manual configuration to be effective in different audio environments. For example, a NS component may have multiple configurations ranging from a conservative NS strategy to an aggressive NS strategy. The video conference participant is faced with a tradeoff between the NS level and the quality of the remaining, unsuppressed audio. If the NS level is too low, distracting noise may not be removed completely. On the other hand, if the NS level is too high, the high NS may impact the integrity of the remaining audio. For example, speech in the unsuppressed audio may sound choppy or distorted.

Traditionally, the selection of audio processing configurations relies on manual operations by a participant using a client device connected to the video conference. But such manual configuration requirements have a steep learning curve. Some configurations require an understanding of audio and participants may lack such knowledge. Participants may not even know of such configuration settings, much less how to change them. In addition, participants may need to update configuration settings as the audio environment changes, even during a single video conference. The need for constant, complex manual intervention for effective deployment of audio processing may result in a poor user experience.

To address this issue, techniques for adaptive audio processing during video conferences are provided. In an example, a client device joins a video conference hosted by a video conference provider, the video conference including a plurality of client devices. For example, the client device may be a laptop, smartphone, or desktop computer running client software provided by the video conference provider. The client software may be used to join an in-progress video conference. This video conference may include multiple participants, each joining from their own client devices, such as smartphones, tablets, or other computers.

The client device receives, from an audio input device, an audio stream. For example, during the video conference, the client device may receive input from an audio input device, like an external microphone, capturing the participant's spoken input. The client device may transform the audio input into a continuous digital audio data flow, or audio stream, that can be transmitted over the network to other meeting participants via the video conference provider. In some examples, the incoming audio stream may be processed by an AEC component after being received by the client device.

The client device determines, by a trained machine learning (ML) model, one or more characteristics of the audio stream. For example, the trained ML model can be trained to detect audio events that reflect characteristics of the audio stream. For instance, the ML model can be trained to detect audio events that include human voices and to further classify the human voices into single voice, multiple voice, or "babble" classes.

The client device determines, based on the one or more characteristics of the audio stream, an audio configuration operation comprising one or more instructions. The one or more instructions may correspond to a task to be performed on the client device relating to the detected one or more characteristics. For example, the audio configuration operation may include instructions to modify at least one of the one or more characteristics of the audio stream. For instance, the audio configuration operation may include instructions to change the NS mode of an NS audio processing component, away from its initial configuration. The changed NS mode may include a greater or lesser degree of NS, depending on the one or more characteristics of the audio stream.

The client device then executes the audio configuration operation. For example, the client device may execute program code corresponding to the one or more instructions. The one or more instructions may use an application programming interface (API) provided by the client device for obtaining programmatic access to the functionality of the client device. For instance, the client device API may include functions for modifying the configurations or settings of one or more audio processing modules, initiating real-time monitoring of the one or more characteristics of the audio stream, performing further processing on the audio stream, accessing components of the client device, and so forth.

The client device then processes, by an audio processing component, the audio stream. For example, the incoming audio stream may be processed by one or more of the audio processing components including AGC, or NS, as described above. The NS, may for instance, have an initial configuration that is modified by the instructions included in the audio configuration operation. Likewise, the AGC may receive instructions included in an audio configuration operation that may modify the processing applied to the audio stream. For example, the audio configuration operation may include instructions to modify a characteristic of the audio stream by changing a configuration of an audio processing component. Following the execution of the audio configuration operation, the audio stream may exhibit changed characteristics based on the modification. For instance, the updated NS mode may result in a higher-quality audio stream. The modified audio stream, following execution of the instructions, may be sent to the video conference provider and subsequently to other video conference participants.

The client device outputs, to the video conference provider, the processed audio stream. The modified audio stream is thus automatically modified based on the characteristics identified by the ML model to provide an optimized user audio experience to the client devices in receipt of the client device audio stream.

The innovations of the present disclosure provide significant improvements in the field of audio processing technology. User awareness of configuration settings is generally low: Indeed, the more technically abstruse the related setting is, the more likely users are to ignore it. Likewise, knowledge of audio processing technologies is similarly lacking, and an optimized user audio experience may not be possible if manual configuration is left up to the users of client devices. Ultimately, effective communications and enterprise revenues are impacted by unoptimized audio. The innovations of the present disclosure address both problems—the lack of awareness and the lack of user knowledge—by shifting the burden of monitoring video conference audio and adjusting configuration settings to the client device to optimize the user audio experience. The flexibility of the components of the present disclosure provides substantial facilities for detecting a broad range of adverse audio conditions and acting to counter those conditions through a task-based approach, using the audio configuration operations, that can address audio issues and improve user audio experience across a substantial functional range of the client device.

These illustrative examples are given to introduce the reader to the general subject matter discussed herein and the disclosure is not limited to these examples. The following sections describe various additional non-limiting examples and techniques for adaptive audio processing during video conferencing.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
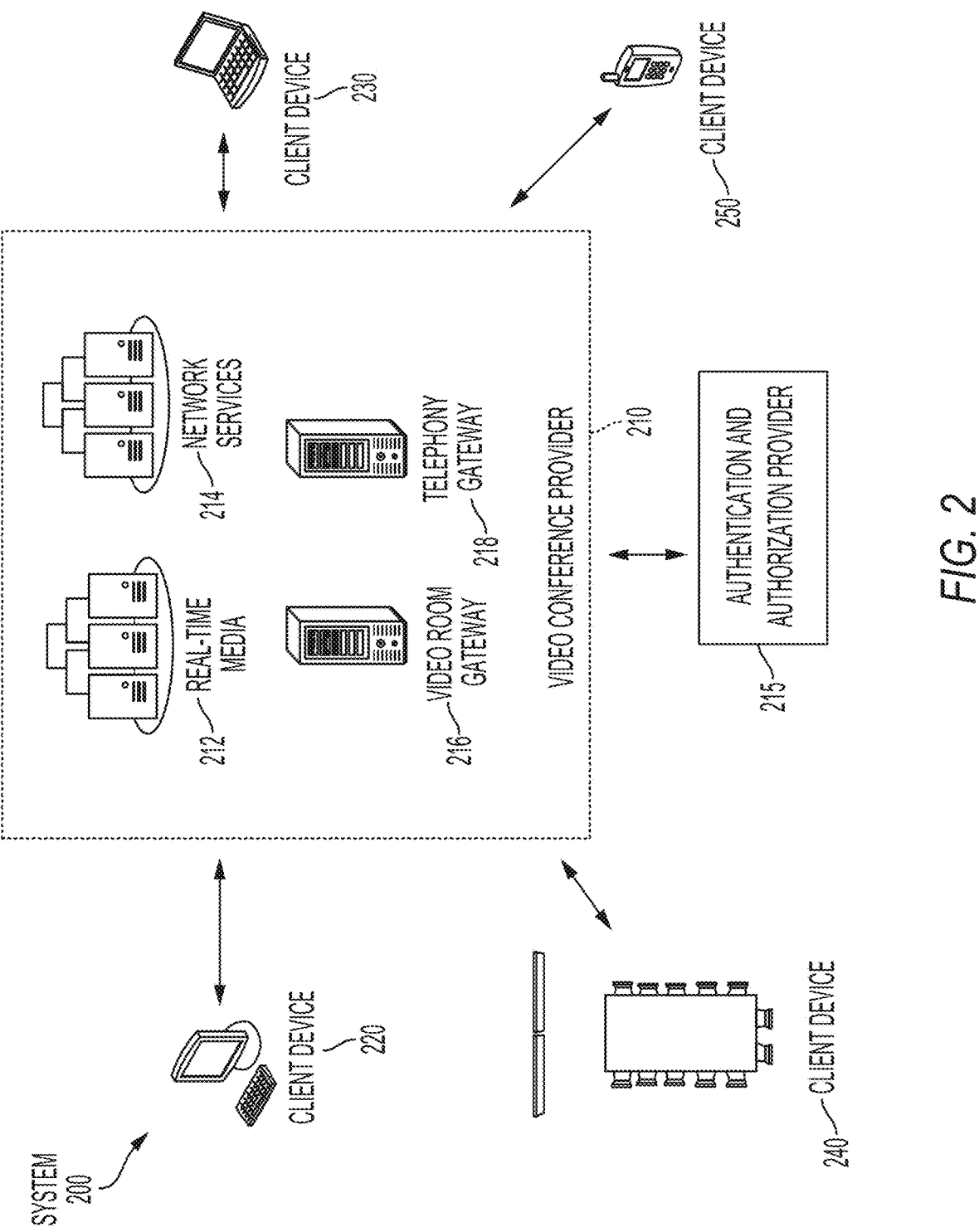
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, the number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/ passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication: for example, encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250), the real-time media servers 212 only deliver multiplex audio streams. The client device 220) may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250) themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel.

The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
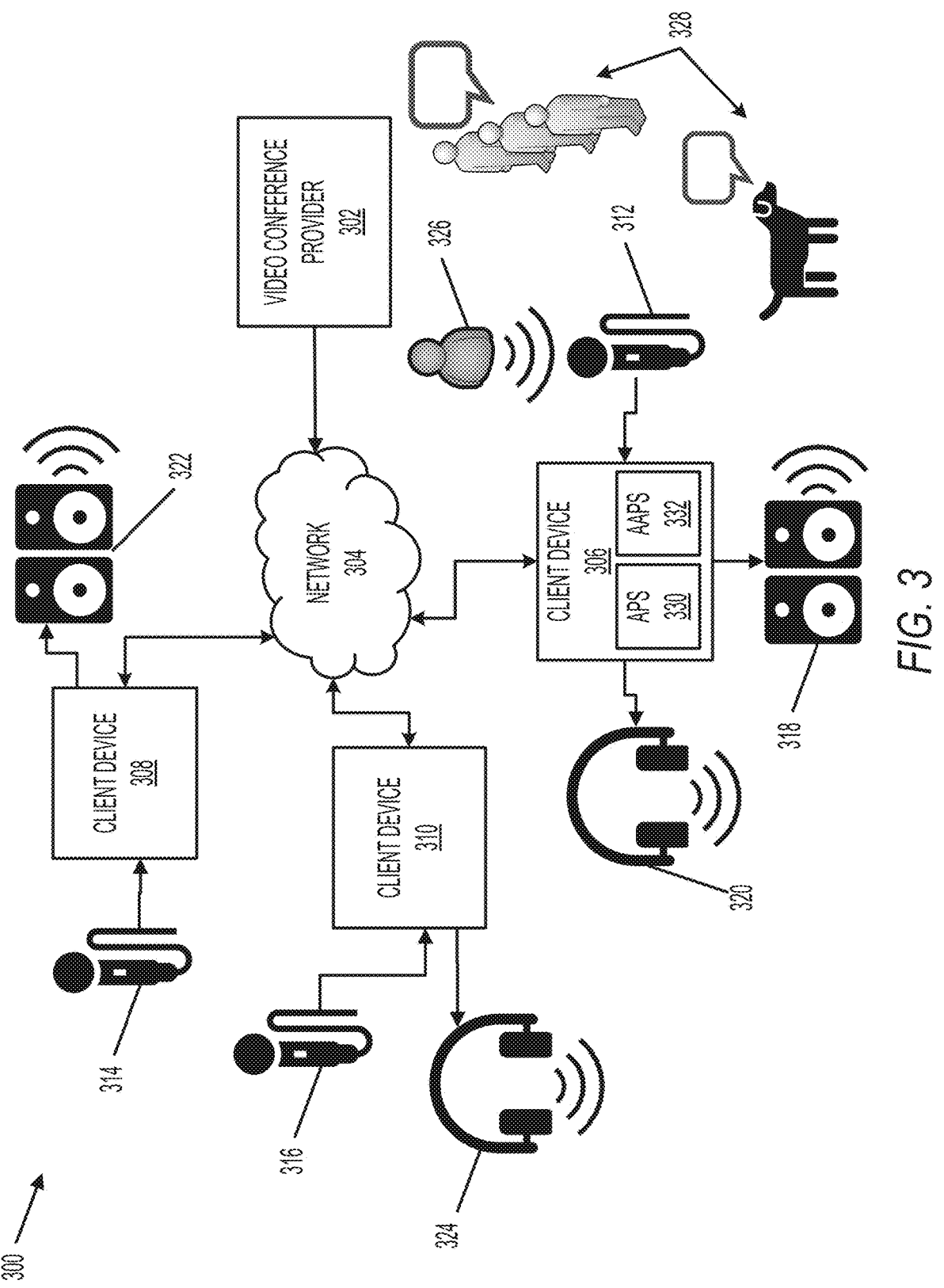
FIG. 3 shows an example of a system for adaptive audio processing during video conferencing, according to some aspects of the present disclosure.

Referring now to FIG. 3, FIG. 3 shows an example of a system 300 for adaptive audio processing during video conferencing, according to some aspects of the present disclosure. One or more client devices 306, 308, 310 are communicatively coupled with a video conference provider 302. For example, the client devices 306, 308, 310 may be coupled to the video conference provider over a network 304. The network 304 can include public networks, private networks, the Internet, or any other suitable combination of networked devices. In some embodiments, the client devices 306, 308, 310 may be configured using point-to-point networking and may be directly communicatively coupled with each other.

In example system 300, the video conference provider 302 hosts a video conference with one or more participating client devices. In some examples, a plurality of client devices may join together to participate in a video conference simultaneously. A video conference may include the video streams of each participant being sent from each respective client device to the video conference provider and then to the client devices of the remaining participants. For example, example system 300 depicts three client devices 306, 308, 310 that may be participants in a video conference.

In addition to a video stream, the video conference may include one or more audio streams. An audio stream may include the audio captured by an audio input device for one or more participants. The audio stream may be sent, by the client devices 306, 308, 310 to the video conference provider 302 over the network 304. The video conference provider 302 may then send the audio stream to the other participants for playback. Some example embodiments may utilize a point-to-point connection approach in which the audio stream may be sent directly from one client device to another over the network 304.

Turning now to a particular client device 306, the client device 306 may be a personal computer, laptop, smartphone, tablet, or similar device. The client device 306 receives audio input through an audio input device 312, like an internal or external microphone. For example, the audio input device 312 may be a built-in microphone included as part of the hardware making up the client device 306. In other examples, the audio input device 312 may be an external microphone communicatively coupled to the client device 306. For instance, the audio input device 312 may be a commercially available microphone that is connected to the client device with a physical connection (e.g., wire) or wirelessly connected using WiFi, Bluetooth, etc.

The client device 306 plays back audio to one or more connected audio output devices 318, 320, like speakers or headphones. The audio output devices 318, 320 can be used to play back audio received from other participants in a video conference. For example, for the video conference depicted in example system 300, audio input may be captured using audio input devices 314, 316 connected to client devices 308, 310. The audio input captured by audio input devices 314, 316 can be played back to the audio output devices 318, 320 connected to client device 306.

In some examples, audio input received from a user of the client device 306 using audio input device 312 is sent to the other client devices 308, 310 for playback. For example, client device 306 may include user 326 speaking into audio input device 312. However, user 326 may be situated in noisy environment 328 or have a low-quality audio input device 312 (e.g., a low-quality embedded laptop micro-phone). As a result, the audio output on audio output devices 322, 324 may be of low quality or be difficult for users of client devices 308, 310 to understand.

Techniques for adaptive audio processing during video conferencing may be used to automatically improve the audio quality output to audio output devices 322, 324 by client device 306. For example, with adaptive audio pro-cessing during video conferencing enabled, the incoming audio stream may first be received by an adaptive audio processing system (AAPS) 332. The AAPS 332 may include components for detecting audio events or information about the audio environment, among other possible detection functions. The audio event detection components may include machine learning (ML) models that can perform various detection functions. The events and information determined by the audio event detection components of AAPS 332 may be received by the adaptive processing components of AAPS 332, as described in detail in FIG. 4 and the accompanying description.

The adaptive processing components of the AAPS 332 may include a variety of functions that can use the output of the audio event detection components. For example, based on the detected events, predictions, or classifications of the audio event detection components of the AAPS 332, the adaptive processing components can select an optimized audio configuration for one or more of the components of the audio processing system. Thus, the components of the AAPS 332 together may be used to automatically improve the audio processing configurations to optimize the output audio for user 326 that is participating in a video conference in a noisy environment 328. For example, the AAPS 332 may automatically output a command to change the NS mode to a mode that is optimized for communicating in a noisy environment 328. The command may change the mode of the NS component of the audio processing system (APS) 330.

The audio stream is then received by the audio processing system (APS) 330. APS 330 may include one or more components like AGC or NS that can change the character-istics of the audio stream (e.g., reducing background noise or adjusting gain). The AGC or NS components may be configured by instructions output by AAPS 332 according to the audio configuration operations determined by the adap-tive processing components of AAPS 332.

Figure 4:
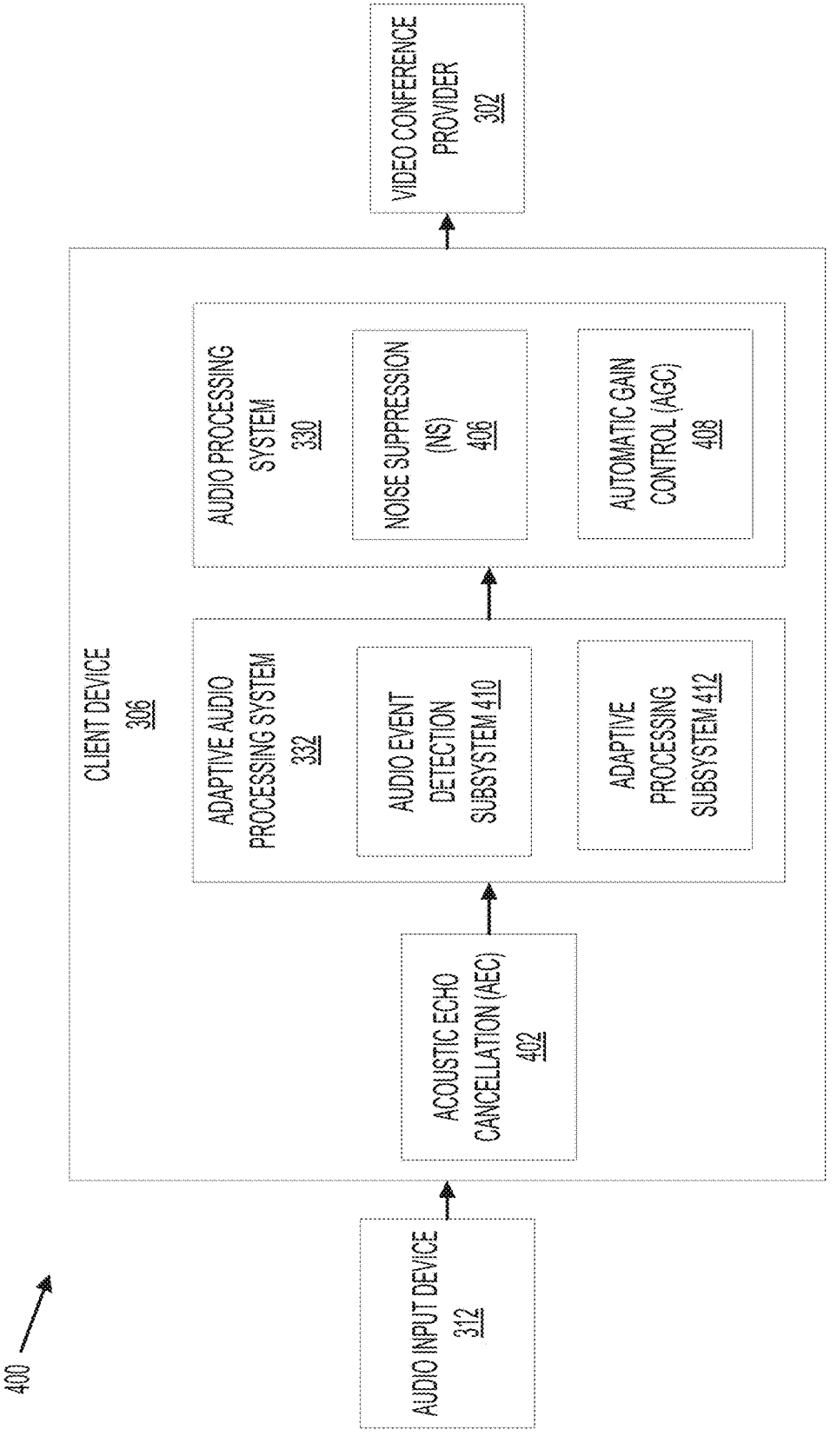
FIG. 4 shows an example of a system for adaptive audio processing during video conferencing, according to some aspects of the present disclosure.

Referring now to FIG. 4, FIG. 4 shows an example of a system 400 for adaptive audio processing during video conferencing, according to some aspects of the present disclosure. System 400 includes the client device 306 of FIG. 3 along with its audio input device 312 (e.g., a microphone). Client device 306 is communicatively coupled with video conference provider 302, which receives the processed audio stream.

Client device 306 includes an AEC 402 component. AEC 402 component can identify and eliminate echo in the audio stream, which may result from the feedback of audio output back into the audio input within an audio system (e.g., a microphone capturing the output of a speaker). AEC 402 may, for example, subtract or phase shift potential echoes from the input audio stream based on the audio output.

Client device 306 includes audio processing system 330. Audio processing system 330) may include one or more components like AGC 408 or NS 406 that can change the characteristics of the audio stream (e.g., reducing back-ground noise or adjusting gain). AGC 408 may automati-cally adjust incoming audio gain settings to normalize the volume of an audio signal to ensure consistent perceived loudness by other participants. AGC 408 can automatically adjust the gain, or amplification level, of the input audio stream based on its volume and certain predefined thresh-olds. AGC 408 can be used to, for example, mitigate the effects of sudden volume spikes or drops.

NS 406 component may include signal processing com-ponents to differentiate between certain audio signals and extraneous background noise. NS 406 can then attenuate or nullify unwanted background noise in real-time. In some examples, NS 406 may include multiple configurations. For example, some NS 406 implementations include settings ranging from a lesser amount of NS (a conservative NS strategy) to a larger amount of NS (an aggressive NS strategy). For instance, some example NS settings include low, medium, original sound (e.g., no change), high, headset high, headset aggressive, or target-speaker, among others.

The selection of an NS setting can reflect a tradeoff between the desired NS level and the quality of the resultant audio. For example, if the NS level is too low, distracting noise cannot be removed completely. On the other hand, if the NS level is too high, the NS 406 component can cause the desired elements of the audio stream (e.g., the voice of the primary speaker) to be choppy or distorted. Thus, for noisy audio with low-quality distorted speech, a lower NS setting should be used since a higher NS setting may make the audio intelligibility even worse. In this example, a low NS setting may preserve more speech information even with a lessened NS ability. In contrast, for a low signal-to-noise ratio (SNR) audio stream (e.g., noisy audio) with high-quality spectral-complete speech, a high NS setting may be preferred due to more substantial NS. "Spectral-complete speech" may refer to human speech in an audio stream that contains the full range of frequency components necessary for comprehensible human speech, typically spanning fre-quencies from around 20 Hz to 20 KHZ, thereby encom-passing all tonal characteristics and harmonics for clear, natural-sounding speech. Traditionally, selection of NS set-tings is performed manually by the user of client device 306. However, techniques for adaptive audio processing during video conferencing can be used, in some examples, to automatically select NS settings based on characteristics determined by audio event detection subsystem 410.

Client device 306 includes adaptive audio processing system 332. Adaptive audio processing system 332 includes components for determining information about the audio stream and using that information about the audio stream to perform certain tasks (e.g., audio configuration operations) relating to client device audio. Adaptive audio processing system 332 includes audio event detection subsystem 410 that can detect events, audio environments, audio input stream characteristics, and so on. For example, the audio event detection subsystem 410 may include one or more machine learning (ML) models that can determine one or more characteristics of the input audio stream. Additional examples will be discussed in FIG. 5 and the accompanying text.

The ML models used by audio event detection subsystem 410 can include models trained using a suitable supervised, semi-supervised, or unsupervised training technique. For example, a neural network could be trained using supervised training methods, including training data consisting of labeled inputs and corresponding outputs, to learn underlying patterns and relationships in incoming audio streams, thus enabling functions such as prediction and classification for new, unseen examples. Likewise, unsupervised training data drawn from unlabeled examples of audio data can be used to identify hidden structures or patterns through techniques such as clustering or dimensionality reduction, thereby surfacing trends and insights from otherwise unstructured and disparate datasets.

In some examples, the ML models may include a deep neural network including convolutional neural network (CNN) layers for feature extraction, gated recurrent unit (GRU) or Long Short-Term Memory (LSTM) layers for time information synthetic, and fully connected layers as classifiers. Other layers can also be used including, for example, attention layers, auto-pooling layers, and so on. Any suitable machine learning model may be used according to different examples, such as linear regression, logistic regression, decision trees, random forests, gradient boosting machines (GBM), support vector machines (SVM), naive Bayes, k-nearest neighbors (KNN), recurrent neural networks (RNN), XGBoost, AdaBoost, and gaussian processes. Further, some examples may employ adversarial networks, such as generative adversarial networks (GANs) while others may employ autoencoders (AEs). Several variations among AEs may be found, including variational AEs (VAEs) or conditional VAEs (CVAEs). GANs and AEs may be used in conjunction in configurations such as AEGANs or variational AEGANS (VAEGANs).

The adaptive processing subsystem 412 receives the outputs of the audio event detection subsystem 410. The adaptive processing subsystem 412 may use the classifications, predictions, and detections of the audio event detection subsystem 410 to determine a variety of functions that may be performed using client device 306 or other components. For example, based on the detected events, predictions, or classifications of the audio event detection subsystem 410, the adaptive processing subsystem 412 can select an optimized audio configuration for one or more of the components of the audio processing system. Additional examples will be discussed in FIG. 5 and the accompanying text.

Adaptive processing subsystem 412 can determine audio configuration operations using various approaches. For example, a series of Boolean logic tests or a logic table may be used, as in the example shown in FIG. 8. In some examples, a rating system may be used. For instance, the various detections, classifications, events, etc. of the audio event detection subsystem 410 may contribute to a weighted combination that can be used to determine the audio configuration operation when certain thresholds are reached. In some other examples, ML models may be used to determine or refine the audio configuration operations. In that case, the associated ML models may include hyperparameters or other threshold values that must be independently calibrated or determined.

Figure 5:
FIG. 5 shows an example of a system for adaptive audio processing during video conferencing, according to some aspects of the present disclosure.

Turning next to FIG. 5, FIG. 5 shows an example of a system 500 for adaptive audio processing during video conferencing, according to some aspects of the present disclosure. System 500 includes example detections, classifications, and other information that can be determined from the input audio stream by audio event detection subsystem 410. For instance, one example detection function of the audio event detection subsystem 410 includes a quality assessment of the audio environment (e.g., quality of speech or quality of microphone 502). Another example detection function can detect the presence of audio "babble" 506 in the incoming audio stream. Audio babble may include multiple, superimposed speech signals, that result in a continuous, unintelligible mixture of voices. Yet another example detection function may include detection of whether the incoming audio stream includes a single speaker 504 or multiple speakers. Still another example audio detection function may include detection of whether the incoming audio stream contains music 508 or not. Another example includes the detection of reverberation 510. These are some examples, but one of ordinary skill in the art will recognize that a variety of potential detection functions may be provided by the audio event detection subsystem. For instance, some examples may include detection of laughter, pet noise, or ambulances or other emergency vehicles that can be automatically abated using the techniques of the present disclosure.

System 500 includes example audio configuration operations that can be determined by adaptive processing subsystem 412. For example, one example function of the adaptive processing subsystem 412 is NS mode auto switching 512. For example, the audio event detection subsystem 410 may detect that the speech in the audio is of high quality (e.g., spectral-complete). As a result, the adaptive processing subsystem 412 can automatically select a higher NS setting. The application of the higher NS setting may result in significantly more NS without loss of audio quality. In NS mode auto switching 512. NS mode may be selected according to predefined logic settings. FIG. 8, discussed below, shows an example of NS mode selection logic given certain outputs from the example detection functions described above.

Another example function of the adaptive processing subsystem 412 is real-time audio quality monitoring 514. The audio event detection subsystem 410 can detect audio quality or microphone quality and classify the output according to quality. In some examples, audio event detection subsystem 410 may output a probability that the audio is high-quality. Audio quality can be monitored using this process in real-time. For example, as the probability of high-quality audio decreases and remains depressed for a pre-determined period of time, the adaptive audio processing subsystem can determine a combination of settings for one or more components of the audio processing system to most effectively deploy NS and other audio quality settings.

For example, the audio event detection subsystem 410 may output detection or classification results periodically with a periodicity in example range 100 ms-1000 ms. The periodicity may be selected depending on application usage, contextual information, and other factors. Likewise, the adaptive processing subsystem 412 may determine audio configuration operations periodically with a periodicity in example range 1-3 seconds. By waiting for a pre-determined period of time (e.g., 5-10 seconds), real-time audio quality monitoring 514 can reduce hysteresis and minimize unwanted automatic actions. In some examples, the adaptive processing subsystem 412 may generate a notification that includes a message indicating that the audio quality has changed and include recommendations for adjusting audio settings to obtain optimized audio quality under the circumstances. For example, adaptive processing subsystem 412 may generate a notification with a message suggesting a different microphone or audio processing setting. Video conference participants may see the notification superimposed over the video conference interface and be caused to make an audio processing configuration adjustment or device adjustment.

Figure 6:
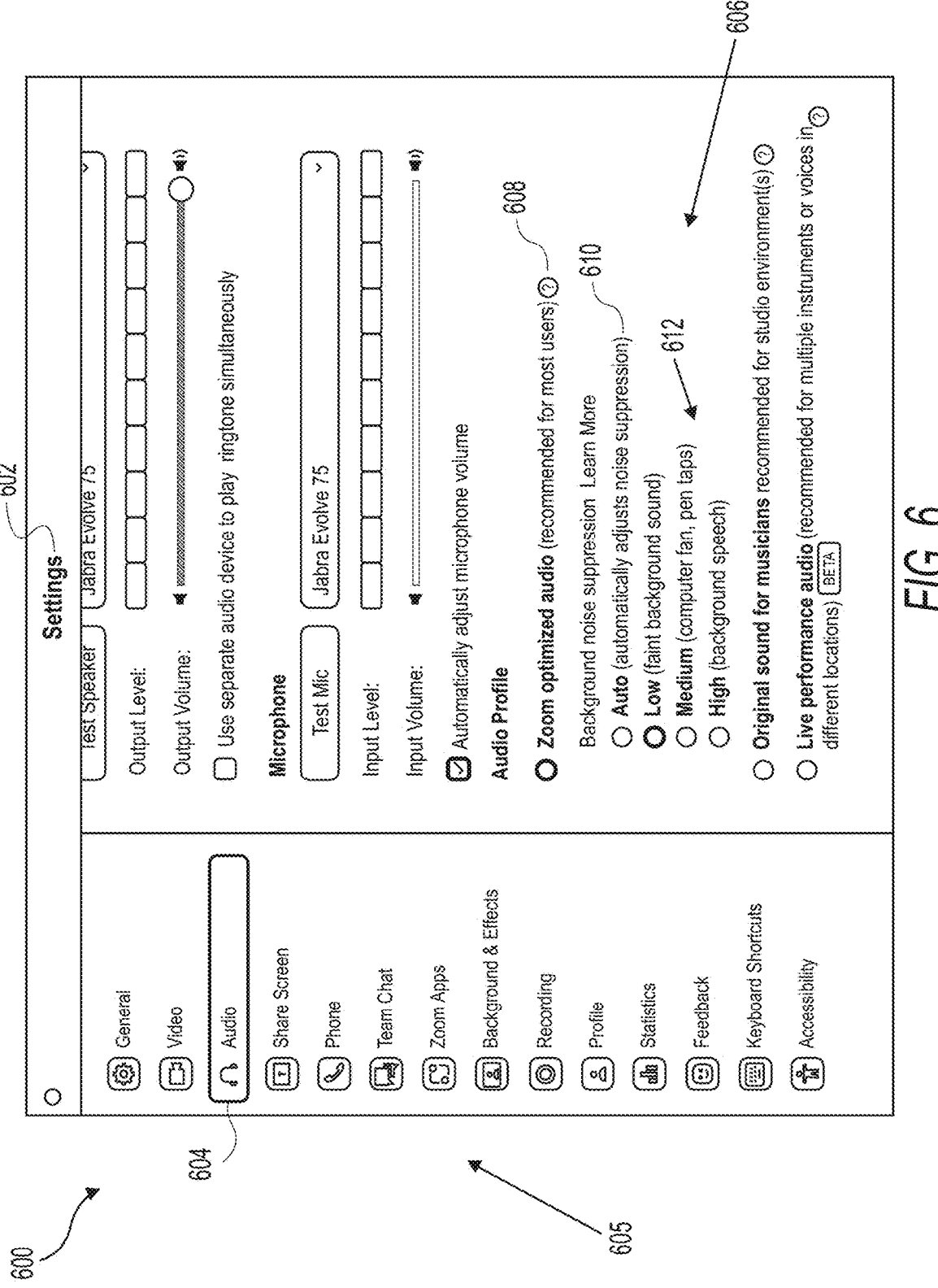
FIG. 6 shows an example of a graphical user interface for adaptive audio processing during video conferencing, according to some aspects of the present disclosure.

Turning next to FIG. 6, FIG. 6 shows an example of a graphical user interface (GUI) 600, for adaptive audio processing during video conferencing, according to some aspects of the present disclosure. GUI 600 illustrates a typical settings page 602 for a video conferencing client device, like client device 306. GUI 600 may provide settings sub-pages 605 for various functions and applications of client device 306. One such sub-page may be an audio sub-page 604.

Audio sub-page 604 may include controls section 606 for client device 306 audio profile. For example, controls section 606 may include controls 608 for optimized audio. For instance, controls 608 may include manual NS settings 612. In some examples, adaptive audio processing during video conferencing can be enabled using auto control 610. With auto control 610 enabled, the components of adaptive audio processing system 332 may be enabled and used to enhance the user audio experience.

Referring now to FIG. 7, FIG. 7 shows a flowchart of an example method 700 for providing adaptive audio processing during video conferencing. The description of the method 700 in FIG. 7 will be made with reference to FIGS. 3-6. However, any suitable system according to this disclosure may be used, such as the example systems 100 and 200, shown in FIGS. 1 and 2.

It should be appreciated that method 700 provides a particular method for providing adaptive audio processing during video conferencing. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. One of ordinary skill in the art would recognize many variations, modifications, and alternatives.

The method 700 may include block 702. At block 702, the client device 306 joins a video conference hosted by a video conference provider 302, the video conference including a plurality of client devices. For example, the client device may be a laptop, smartphone, or desktop computer running client software provided by the video conference provider. The client software may be used to join an in-progress video conference. This video conference may include multiple participants, each joining from their own client devices, such as smartphones, tablets, or other computers. The client device 306 and video conference provider 302 may be communicatively coupled over network 304 as shown in FIG. 3 and the accompanying description. Video conference provider 302 may include characteristics of the video conference provider 110, 210 and discussed in FIGS. 1 and 2, respectively.

At block 704, the client device 306 receives, from an audio input device, an audio stream. For example, during the video conference the client device may receive input from an audio input device, like an external microphone, capturing the participant's spoken input. The client device may transform the audio input into a continuous digital audio data flow that can be transmitted over the network to other meeting participants via the video conference provider. In some examples, the incoming audio stream may be processed by an AEC component after being received by the client device.

At block 706, the client device 306 determines, by a trained machine learning model, one or more characteristics of the audio stream. For example, the trained ML model can be trained to detect audio events that reflect characteristics of the audio stream. For instance, the ML model can be trained to audio events that include human voices and to further classify the human voices into single voice, multiple voice, or babble classes. The ML models can be trained using open-source, licensed audio data, or proprietary third-party data. In some examples, custom tools for the creation of synthetic audio data may be used to generate training data to train the ML models. Some example ML models and detectable events are discussed with respect to the audio event detection subsystem 410 in FIGS. 4 and 5 and their accompanying descriptions.

At block 708, the client device 306 determines, based on the one or more characteristics of the audio stream, an audio configuration operation comprising one or more instructions. The one or more instructions may correspond to a task to be performed on the client device relating to the detected one or more characteristics. For example, the audio configuration operation may include instructions to modify at least one of the one or more characteristics of the audio stream. For instance, the audio configuration operation may include instructions to change the noise suppression mode of the NS audio processing component. The changed noise suppression mode may include a greater or lesser degree of NS, depending on the one or more characteristics of the audio stream. Some example audio configuration operations are discussed with respect to the adaptive processing subsystem 412 in FIG. 5 and the accompanying description.

At block 710, the client device 306 executes the audio configuration operation. For example, the client device may execute programming code corresponding to the one or more instructions. The one or more instructions may use an application programming interface (API) provided by the client device for obtaining programmatic access to the functionality of the client device. For instance, the client device API may include functions for modifying the configurations or settings of the audio processing modules, initiating real-time monitoring of the one or more characteristics of the audio stream, performing further processing on the audio stream, accessing components of the client device, and so forth.

At block 712, the client device 306 processes, by an audio processing component, the audio stream. For example, the incoming audio stream may be processed by one or more of the audio processing components including AGC, or NS, as described above. The NS, may for instance, have an initial configuration that is modified by the instructions included in the audio configuration operation. Likewise, the AGC may receive instructions included in an audio configuration operation that may modify the processing applied to the audio stream. For example, the audio configuration operation may include instructions to modify a characteristic of the audio stream by changing a configuration of an audio processing component. Following the execution of the audio configuration operation, the audio stream may exhibit changed characteristics based on the modification. For instance, the updated NS mode may result in a higher-quality audio stream. The modified audio stream, following execution of the instructions, may be sent to the video conference provider and subsequently to other video conference participants. In some examples, the audio input is processed by the AEC 402 component first, as shown in FIG. 4 and the accompanying description.

At block 714, the client device 306 outputs, to the video conference provider 302, the audio stream. The modified audio stream is thus automatically modified based on the characteristics identified by the ML model to provide an optimized user audio experience to the client devices in receipt of the client device audio stream. In some examples, the video conference provider 302 may receive the audio stream and apply additional processing including automatic speech recognition, voice cloning, dubbing, transcript, and so on. In parallel with the additional processing operations, the audio stream can be relaying to the other video conference participants for the provision of a real-time video and audio experience.

FIG. 8 shows a table 800 relating to certain aspects of techniques for adaptive audio processing during video conferencing, according to some aspects of the present disclosure. Table 800 depicts an example of NS mode selection logic. The audio event detection subsystem 410 may output certain detections 802 based on classifications, predictions, or other ML model outputs. Based on those detections 802, the NS mode 804 may be selected. Given the selected NS mode 804, the adaptive processing subsystem 412 can generate an audio configuration operation including instructions to enable the selected NS mode 804. For example, in row 806, a detected high quality microphone, a detected single speaker, no detected babble, and no detected music may result in a selection of NS mode "headset aggressive."

Figure 9:
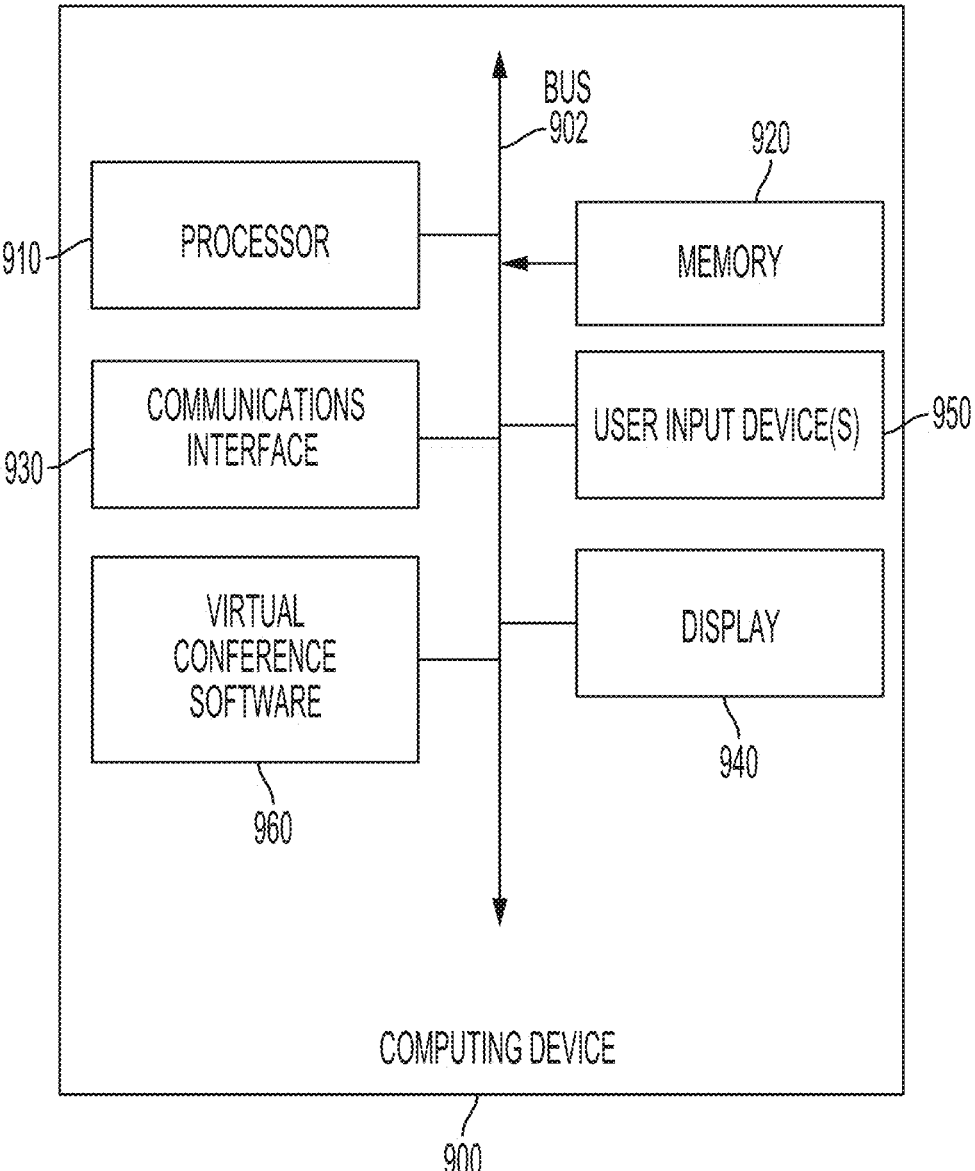
FIG. 9 shows an example computing device suitable for use in example systems or methods for adaptive audio processing during video conferencing, according to some aspects of the present disclosure.

Referring now to FIG. 9, FIG. 9 shows an example computing device 900 suitable for use in example systems or methods for providing adaptive audio processing during video conferencing according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for adaptive audio processing during video conferencing according to different examples, such as part or all of the example method 700 described above with respect to FIG. 6. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"): wide area network ("WAN"), such as the Internet: metropolitan area network ("MAN"): point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example." "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone: B alone: C alone: A and B only; A and C only: B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: joining a video conference hosted by a video conference provider, the video conference including a plurality of client devices: receiving, from an audio input device, an audio stream: processing, by an audio processing component, the audio stream: determining, by a trained machine learning model, one or more characteristics of the audio stream: determining, based on the one or more characteristics of the audio stream, an audio configuration operation comprising one or more instructions: executing the audio configuration operation; and outputting, to the video conference provider, the audio stream.

Example 2 is the method of example(s) 1, wherein the audio configuration operation includes instructions to modify at least one of the one or more characteristics of the audio stream.

Example 3 is the method of example(s) 1, wherein: processing the audio stream comprises: receiving, by the audio processing component, the audio stream; executing, by the audio processing component, an audio processing operation, wherein the audio processing operation includes a modification of at least one of the one or more characteristics of the audio stream; and the audio configuration operation determines the modification of at least one of the one or more characteristics of the audio stream.

Example 4 is the method of example(s) 1, wherein: the audio processing component is a noise suppression component: the audio configuration operation includes instructions to change a noise suppression mode; and processing the audio stream comprises: receiving, by the noise suppression component, the audio stream: executing the instructions to change the noise suppression mode; and executing, by the noise suppression component, a noise suppression operation, corresponding to the changed noise suppression mode.

Example 5 is the method of example(s) 1, wherein the one or more characteristics of the audio stream include one or more of speech quality, microphone quality, single-speaker, babble, music, or reverberation.

Example 6 is the method of example(s) 1, wherein: the one or more characteristics of the audio stream include speech quality and microphone quality; and the audio configuration operation includes instructions to perform real-time speech quality monitoring, comprising: determining that at least one of the characteristics including speech quality or microphone quality is below a pre-determined threshold for a pre-determined period of time: generating a notification comprising an indication of at least one of the speech quality or microphone quality; and outputting the notification.

Example 7 is the method of example(s) 1, wherein: the audio processing component is a noise suppression component: the audio configuration operation includes instructions to change a noise suppression mode; and determining, based on the one or more characteristics of the audio stream, the audio configuration operation comprises determining the instructions to change the noise suppression mode using an audio configuration operation logic table.

Example 8 is the method of example(s) 1, wherein: the audio processing component is a noise suppression component: the audio configuration operation includes instructions to change a noise suppression mode, wherein the noise suppression mode includes at least one of a high noise suppression mode, a medium noise suppression mode, or a low noise suppression mode; and determining, based on the one or more characteristics of the audio stream, the audio configuration operation comprises determining the instructions to change the noise suppression mode, based on the one or more characteristics including at least microphone quality, single-speaker, babble, and music.

Example 9 is the method of example(s) 1, wherein the audio configuration operation comprises instructions to output a notification to a client device, wherein the notification includes a message to change an audio configuration based on the one or more characteristics.

Example 10 is the method of example(s) 1, wherein receiving, from the audio input device, the audio stream comprises: segmenting the audio stream into one or more audio segments; and for each audio segment, executing a signal processing instruction comprising at least one of short-time Fourier transform or conversion to a Mel spectrogram.

Example 11 is a system comprising: one or more computer systems, wherein the one or more computer systems are configured to perform processing comprising: joining a video conference hosted by a video conference provider, the video conference including a plurality of client devices: receiving, from an audio input device, an audio stream: processing, by an audio processing component, the audio stream: determining, by a trained machine learning model, one or more characteristics of the audio stream: determining, based on the one or more characteristics of the audio stream, an audio configuration operation comprising one or more instructions: executing the audio configuration operation; and outputting, to the video conference provider, the audio stream.

Example 12 is the system of example(s) 11, wherein the audio configuration operation includes instructions to modify at least one of the one or more characteristics of the audio stream.

Example 13 is the system of example(s) 11, wherein: processing the audio stream comprises: receiving, by the audio processing component, the audio stream; executing, by the audio processing component, an audio processing operation, wherein the audio processing operation includes a modification of at least one of the one or more characteristics of the audio stream; and the audio configuration operation determines the modification of at least one of the one or more characteristics of the audio stream.

Example 14 is the system of example(s) 11, wherein: the audio processing component is a noise suppression component: the audio configuration operation includes instructions to change a noise suppression mode; and processing the audio stream comprises: receiving, by the noise suppression component, the audio stream: executing the instructions to change the noise suppression mode; and executing, by the noise suppression component, a noise suppression operation, corresponding to the changed noise suppression mode.

Example 15 is the system of example(s) 11, wherein: the one or more characteristics of the audio stream include one or more of speech quality, microphone quality, single-speaker, babble, music, or reverberation; and the audio configuration operation includes instructions to perform real-time speech quality monitoring, comprising: determining that at least one of the characteristics including speech quality or microphone quality is below a pre-determined threshold for a pre-determined period of time: generating a notification comprising an indication of at least one of the speech quality or microphone quality; and outputting the notification.

Example 16 is a computer program product, comprising a computer program or instructions which, when executed by a processor, cause the processor to perform processing including: joining a video conference hosted by a video conference provider, the video conference including a plurality of client devices: receiving, from an audio input device, an audio stream: processing, by an audio processing component, the audio stream; determining, by a trained machine learning model, one or more characteristics of the audio stream: determining, based on the one or more characteristics of the audio stream, an audio configuration operation comprising one or more instructions: executing the audio configuration operation; and outputting, to the video conference provider, the audio stream.

Example 17 is the computer program product of example (s) 16, wherein: the audio processing component is a noise suppression component: the audio configuration operation includes instructions to change a noise suppression mode; and determining, based on the one or more characteristics of the audio stream, the audio configuration operation comprises determining the instructions to change the noise suppression mode using an audio configuration operation logic table.

18. The computer program product of example(s) 16, wherein: the audio processing component is a noise suppression component: the audio configuration operation includes instructions to change a noise suppression mode, wherein the noise suppression mode includes at least one of a high noise suppression mode, a medium noise suppression mode, or a low noise suppression mode; and determining, based on the one or more characteristics of the audio stream, the audio configuration operation comprises determining the instructions to change the noise suppression mode, based on the one or more characteristics including at least microphone quality, single-speaker, babble, and music.

Example 19 is the computer program product of example(s) 16, wherein the audio configuration operation comprises instructions to output a notification to a client device, wherein the notification includes a message to change an audio configuration based on the one or more characteristics.

Example 20 is the computer program product of example (s) 16, wherein receiving, from the audio input device, the audio stream comprises: segmenting the audio stream into one or more audio segments; and for each audio segment, executing a signal processing instruction comprising at least one of short-time Fourier transform or conversion to a Mel spectrogram.

That which is claimed is:

1. A computer-implemented method, comprising:
joining a video conference hosted by a video conference provider, the video conference including a plurality of client devices;
receiving, from an audio input device, an audio stream;
determining, by a trained machine learning model, one or more characteristics of the audio stream;
determining, based on the one or more characteristics of the audio stream, an audio configuration operation comprising one or more instructions, the one or more instructions comprising application programming interface ("API") commands for programmatically modifying one or more audio configurations of the client devices;
executing the audio configuration operation;
processing, by an audio processing component, the audio stream; and
outputting, to the video conference provider, the audio stream.

2. The method of claim 1, wherein the audio configuration operation includes instructions to modify at least one of the one or more characteristics of the audio stream.

3. The method of claim 1, wherein:
processing the audio stream comprises:
receiving, by the audio processing component, the audio stream;
executing, by the audio processing component, an audio processing operation, wherein the audio processing operation includes a modification of at least one of the one or more characteristics of the audio stream; and
the audio configuration operation determines the modification of at least one of the one or more characteristics of the audio stream.

4. The method of claim 1, wherein:
the audio processing component is a noise suppression component;
the audio configuration operation includes instructions to change a noise suppression mode; and
processing the audio stream comprises:
receiving, by the noise suppression component, the audio stream;
executing the instructions to change the noise suppression mode; and
executing, by the noise suppression component, a noise suppression operation, corresponding to the changed noise suppression mode.

5. The method of claim 1, wherein the one or more characteristics of the audio stream include one or more of speech quality, microphone quality, single-speaker, babble, music, or reverberation.

6. The method of claim 1, wherein:
the one or more characteristics of the audio stream include speech quality and microphone quality; and
the audio configuration operation includes instructions to perform real-time speech quality monitoring, comprising:
determining that at least one of the characteristics including speech quality or microphone quality is below a pre-determined threshold for a pre-determined period of time;
generating a notification comprising an indication of at least one of the speech quality or microphone quality; and
outputting the notification.

7. The method of claim 1, wherein:

the audio processing component is a noise suppression component;

the audio configuration operation includes instructions to change a noise suppression mode; and determining, based on the one or more characteristics of the audio stream, the audio configuration operation comprises determining the instructions to change the noise suppression mode using an audio configuration operation logic table.

8. The method of claim 1, wherein:

the audio processing component is a noise suppression component;

the audio configuration operation includes instructions to change a noise suppression mode, wherein the noise suppression mode includes at least one of a high noise suppression mode, a medium noise suppression mode, or a low noise suppression mode; and determining, based on the one or more characteristics of the audio stream, the audio configuration operation comprises determining the instructions to change the noise suppression mode, based on the one or more characteristics including at least microphone quality, single-speaker, babble, and music.

9. The method of claim 1, wherein the audio configuration operation comprises instructions to output a notification to a client device, wherein the notification includes a message to change an audio configuration based on the one or more characteristics.

10. The method of claim 1, wherein receiving, from the audio input device, the audio stream comprises:

segmenting the audio stream into one or more audio segments; and for each audio segment, executing a signal processing instruction comprising at least one of short-time Fourier transform or conversion to a Mel spectrogram.

11. A system comprising:

one or more computer systems, wherein the one or more computer systems are configured to perform processing comprising:

joining a video conference hosted by a video conference provider, the video conference including a plurality of client devices;

receiving, from an audio input device, an audio stream;

determining, by a trained machine learning model, one or more characteristics of the audio stream;

determining, based on the one or more characteristics of the audio stream, an audio configuration operation comprising one or more instructions, the one or more instructions comprising API commands for programmatically modifying one or more audio configurations of the client devices;

executing the audio configuration operation;

processing, by an audio processing component, the audio stream; and outputting, to the video conference provider, the audio stream.

12. The system of claim 11, wherein the audio configuration operation includes instructions to modify at least one of the one or more characteristics of the audio stream.

13. The system of claim 11, wherein:

processing the audio stream comprises:

receiving, by the audio processing component, the audio stream;

executing, by the audio processing component, an audio processing operation, wherein the audio processing operation includes a modification of at least one of the one or more characteristics of the audio stream; and the audio configuration operation determines the modification of at least one of the one or more characteristics of the audio stream.

14. The system of claim 11, wherein:

the audio processing component is a noise suppression component;

the audio configuration operation includes instructions to change a noise suppression mode; and processing the audio stream comprises:

receiving, by the noise suppression component, the audio stream;

executing the instructions to change the noise suppression mode; and executing, by the noise suppression component, a noise suppression operation, corresponding to the changed noise suppression mode.

15. The system of claim 11, wherein:

the one or more characteristics of the audio stream include one or more of speech quality, microphone quality, single-speaker, babble, music, or reverberation; and the audio configuration operation includes instructions to perform real-time speech quality monitoring, comprising:

determining that at least one of the characteristics including speech quality or microphone quality is below a pre-determined threshold for a pre-determined period of time;

generating a notification comprising an indication of at least one of the speech quality or microphone quality; and outputting the notification.

16. A computer program product, comprising a computer program or instructions which, when executed by a processor, cause the processor to perform processing including:

joining a video conference hosted by a video conference provider, the video conference including a plurality of client devices;

receiving, from an audio input device, an audio stream;

determining, by a trained machine learning model, one or more characteristics of the audio stream;

determining, based on the one or more characteristics of the audio stream, an audio configuration operation comprising one or more instructions, the one or more instructions comprising API commands for programmatically modifying one or more audio configurations of the client devices;

executing the audio configuration operation;

processing, by an audio processing component, the audio stream; and outputting, to the video conference provider, the audio stream.

17. The computer program product of claim 16, wherein:

the audio processing component is a noise suppression component;

the audio configuration operation includes instructions to change a noise suppression mode; and determining, based on the one or more characteristics of the audio stream, the audio configuration operation comprises determining the instructions to change the noise suppression mode using an audio configuration operation logic table.

18. The computer program product of claim 16, wherein:

the audio processing component is a noise suppression component;

the audio configuration operation includes instructions to change a noise suppression mode, wherein the noise suppression mode includes at least one of a high noise suppression mode, a medium noise suppression mode, or a low noise suppression mode; and determining, based on the one or more characteristics of the audio stream, the audio configuration operation comprises determining the instructions to change the noise suppression mode, based on the one or more characteristics including at least microphone quality, single-speaker, babble, and music.

19. The computer program product of claim 16, wherein the audio configuration operation comprises instructions to output a notification to a client device, wherein the notification includes a message to change an audio configuration based on the one or more characteristics.

20. The computer program product of claim 16, wherein receiving, from the audio input device, the audio stream comprises:

segmenting the audio stream into one or more audio segments; and for each audio segment, executing a signal processing instruction comprising at least one of short-time Fourier transform or conversion to a Mel spectrogram.

* * * * *